United States Patent [19]
Beckman

[11] 3,935,744
[45] Feb. 3, 1976

[54] CLINICAL THERMOMETER

[75] Inventor: Paul Beckman, Huntington Valley, Pa.

[73] Assignee: United States Surgical Corporation, Baltimore, Md.

[22] Filed: Sept. 18, 1973

[21] Appl. No.: 398,327

Related U.S. Application Data

[63] Continuation-in-part of Ser. No. 324,015, Jan. 16, 1973, abandoned.

[52] U.S. Cl. .................... 73/361; 73/359; 136/226
[51] Int. Cl.² ...................... G01K 7/12; G01K 1/18
[58] Field of Search ...... 73/341, 359, 361; 128/2 H; 136/221, 224, 225, 226

[56] References Cited
UNITED STATES PATENTS

| | | | |
|---|---|---|---|
| 1,752,117 | 3/1930 | Smith | 128/2 H X |
| 1,942,516 | 1/1934 | Noyes | 73/359 X |
| 2,012,112 | 8/1935 | States | 136/224 |
| 2,580,293 | 12/1951 | Gier et al. | 136/226 X |
| 2,871,701 | 2/1959 | Knudsen | 73/361 |
| 2,983,031 | 5/1961 | Blanchard | 136/226 X |
| 3,503,260 | 3/1970 | Polsky | 73/361 |
| 3,681,993 | 8/1972 | Campton et al. | 73/362 AR |
| 3,789,340 | 1/1974 | Adams | 73/362 AR X |

*Primary Examiner*—Richard C. Queisser
*Assistant Examiner*—Frederick Shoon
*Attorney, Agent, or Firm*—Fleit & Jacobson

[57] ABSTRACT

A clinical thermometer having a probe with a thermopile mounted thereon. The probe is inserted into a connector housing which includes a resistance thermometer for measuring the temperature of the cold junctions of the thermopile. The connector housing includes a portion of an electrical circuit mounted on a circuit board which is electrically connected to the resistance thermometer. The circuit board is electrically connected to a meter box having the remaining portion of the electrical circuit contained therein. The meter box includes a dial which is calibrated in degrees of temperature for visually indicating the temperature sensed by the hot junctions of the thermopile. The probe is releasably secured within the connector housing so that probes can be easily inserted and removed. The clinical thermometer provides a mechanism whereby the body temperature of a patient can be measured quickly and easily and without maintaining the cold junctions of the thermopile at a constant reference temperature.

49 Claims, 8 Drawing Figures

CLINICAL THERMOMETER

CROSS-REFERENCE TO RELATED APPLICATION

This is a continuation-in-part of application Ser. No. 324,015, filed Jan. 16, 1973, now abandoned.

BACKGROUND OF THE INVENTION

1. Field of the Invention.

This invention relates to the field of clinical thermometers. In particular, this invention relates to clinical thermometers having a probe with a thermopile mounted thereon. More particularly, this invention relates to a clinical thermometer in which the temperature of the cold or reference junctions of a thermopile is measured by a resistance thermometer. Further, this invention pertains to a clinical thermometer wherein a resistance thermometer is included in an electrical bridge circuit which is used to compensate for temperature fluctuations at the cold or reference junctions. The bridge circuit is connected to a meter which visually indicates the temperature sensed by the hot junctions of the thermopile.

2. Prior Art.

Clinical thermometers employing a thermocouple sensor are well known in the art. For example, Rentz U.S. Pat. No. 3,464,864, Jones U.S. Pat. No. 3,507,153, Moore U.S. Pat. No. 3,531,992 and Jarzembski U.S. Pat. No. 3,688,580 show devices utilizing a thermocouple for measuring the body temperature of animals and humans. In devices such as that shown in the Rentz patent, a thermocouple is used to measure the skin temperature of animals. The thermocouple is part of a button securing mechanism which holds the thermocouple to the skin surface of the subject. In devices such as described in the Jones and Moore patents, a thermocouple is inserted into the ear canal covered with a cotton membrane which leads to temperature inaccuracies due to the cotton membrane insulating properties. The Jarzembski patent discloses a disposable thermocouple probe and a connecting device which provides mechanical and electrical connection between the probe and a measuring and indicating assembly. The reference junction in the Jarzembski patent is provided within a thermally regulated oven which is maintained at a predetermined temperature and so no temperature compensation means are employed.

Temperature measuring devices employing a thermopile sensor are also known in the art. For example, Evins U.S. Pat. Nos. 1,552,284, 1,610,271 and 1,648,939 disclose thermopile sensors for measuring the external skin or body temperature. Other thermopile sensors and various methods for forming the sensors are shown in Thorpe U.S. Pat. No. 1,706,419 and Canada U.S. Pat. No. 2,562,696.

The use of a thermally sensitive resistor connected to compensate for changes in the temperature of the reference junction of a thermocouple and thermopile sensor are shown in Engelhard U.S. Pat. No. 3,225,597 and Wescott U.S. Pat. No. 3,580,074, respectively. However, these devices do not provide a disposable probe or a connector housing having a resistance thermometer for detachably mounting the probe.

In devices such as those shown in Glick U.S. Pat. No. 3,485,102 and in Ensign U.S. Pat. Nos. 3,367,186 and 3,500,280, thermistors are embedded in the end of a probe member attached to a meter having a dial reading in degrees of temperature for measuring a particular cavity temperature. These patents show the probe member being detachable from the rest of the temperature sensing system; however, these devices rely on thermistors which are quite different from thermopile sensors.

Other devices such as that shown in Moses U.S. Pat. No. 3,153,769, Catlin U.S. Pat. No. 3,402,378 and Biber U.S. Pat No. 3,221,555 use thermistor-type sensing mechanisms wherein the temperature sensor is encased and temperature discrepancies may occur due to conduction losses. Additionally, in such devices the probe is not electrically or mechanically attachable to a connector housing which contains a resistance thermometer.

SUMMARY OF THE INVENTION

An object of the present invention is to provide an improved clinical thermometer.

Another object of the present invention is to provide a clinical thermometer which is highly accurate and can be easily and inexpensively manufactured.

Still another object of the present invention is to provide a clinical thermometer having a disposable probe.

A further object of the present invention is to provide a temperature sensing probe having a thermopile mounted thereon and a connector housing for detachably mounting the temperature sensing probe.

The above-enumerated objects of the present invention as well as other objects which will become apparent upon reading the undergoing specification and attached drawings are realized by the use of a clinical thermometer which includes a probe having a thermopile mounted thereon. The thermopile comprises a plurality of thermocouples connected in series and defines a plurality of hot junctions formed near a first end of the probe and a plurality of cold junctions formed near a second end of the probe. The clinical thermometer also includes a connector housing having a mechanism for measuring the temperature of the cold junctions of the thermopile and an electrical bridge circuit partially disposed in the connector housing. The mechanism for measuring the temperature of the cold junctions forms one arm of the electrical bridge circuit and compensates for fluctuations in the temperature of the cold junctions.

DESCRIPTION OF THE PREFERRED EMBODIMENTS

Figure 1:
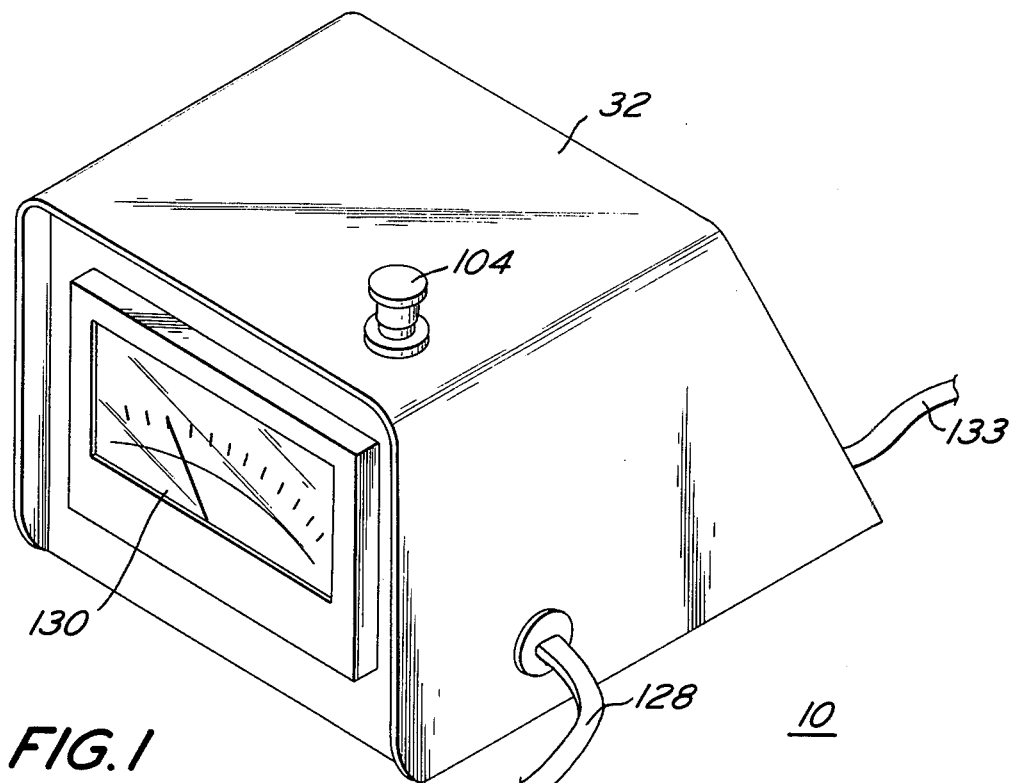
FIG. 1 is a perspective view of the clinical thermometer system showing both the meter and probe as well as the connector housing.
Figure 2:
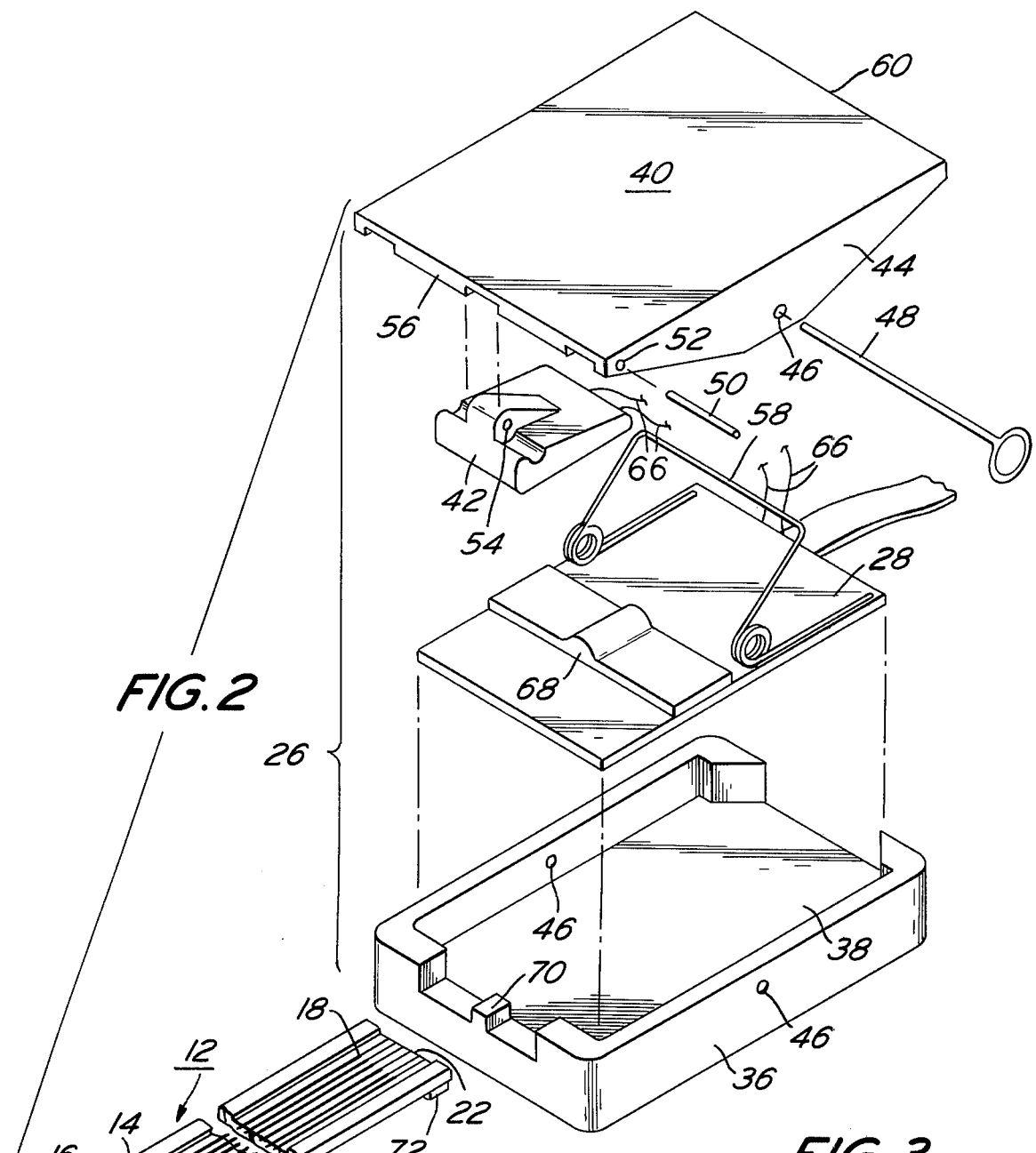
FIG. 2 is a perspective, exploded view of the connector housing showing the insertion of the probe.
Figure 3:
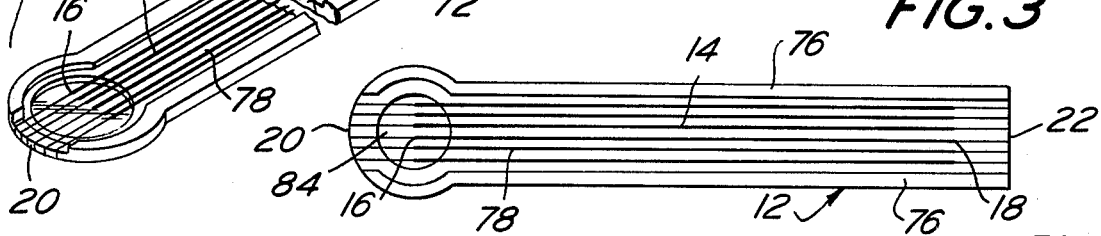
FIG. 3 is a planar view of the probe showing the upper surface.

Referring now to FIGS. 1, 2 and 3, there is shown clinical thermometer 10 for determining body temperature through generation of an electromotive force as well as the accurate sensing and translation of the electromotive force into a reading in degrees of temperature. In general, temperature measuring system 10 comprises a modular system having a temperature sensing mechanism which is disposable and is constructed to allow a temperature reading to be taken in a matter of seconds. Clinical thermometer 10 may be utilized in hospitals or other medical centers for taking an accurate and quick oral or rectal temperature reading in animal or human patients.

Figure 4:
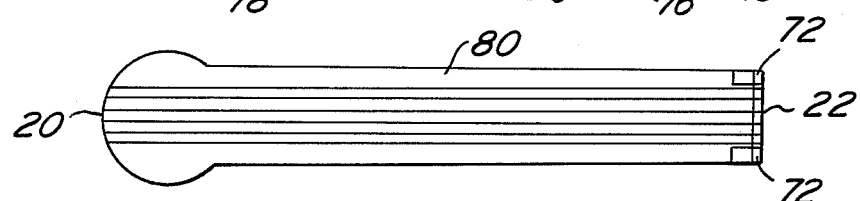
FIG. 4 is a planar view of the probe showing the lower surface.
Figure 8:
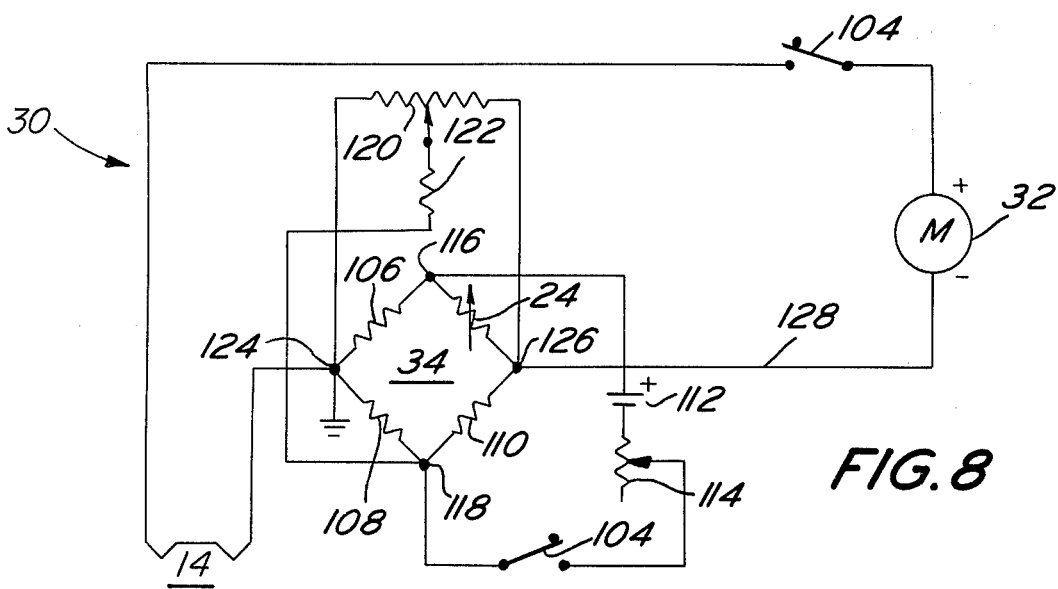
FIG. 8 is the circuit diagram of the clinical thermometer system.

Clinical thermometer 10 comprises probe 12 shown in FIGS. 3 and 4 which has thermopile 14 mounted thereon. Thermopile 14 comprises a plurality of thermocouples connected in series defining measuring or hot junctions 16 formed near first end 20 of probe 12 and associated cold or reference junctions 18 formed near second end 22. Resistance thermometer mechanism 24 is included within connector housing 26 for measuring the temperature of cold junctions 18 of thermopile 14. Electrical circuit 30 which is partially mounted on circuit board 28 and partially within galvanometer housing 32 is shown in FIG. 8. Electrical circuit 30 measures the temperature sensed at hot junctions 16 of thermopile 14. Resistance thermometer mechanism 24 compensates for fluctuations in the temperature of cold junctions 18 and forms one arm of bridge circuit 34.

Connector housing 26 is constructed from a plurality of elements and provides a mechanism for housing resistance thermometer mechanism 24 and circuit board 28 for releasably mounting probe 12 in a predetermined position. Connector housing 26 includes connector housing base 36 having a recess 38 formed therein. Circuit board 28 containing a portion of electrical bridge circuit 34 is mounted in connector housing base 36 within recess 38. The upper portion of connector housing 26 defines a mechanism for locating resistance thermometer mechanism 24 in good physical and thermal contact with cold junctions 18 of thermopile 14 and includes upper connector housing 40 and connector housing pivot element 42.

Figure 6:
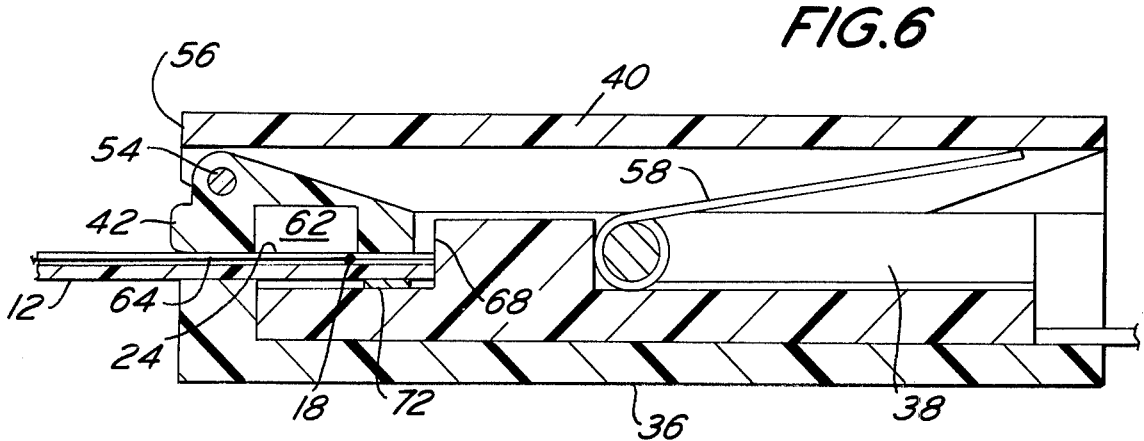
FIG. 6 is a cross-sectional view of the connector housing and inserted probe taken along the line 6—6 of FIG. 1.

Upper connector housing 40 has substantially triangular-shaped, opposed longitudinal walls 44 and is pivotally connected to connector housing base 36 by inserting pivot pin 48 through pivot openings 46 in upper connector housing 40 and connector housing base 36. In this manner, upper connector housing 40 can be pivotally moved with respect to connector housing base 36. Additionally, connector housing pivot element 42 is pivotally mounted to upper connector housing 40 at forward end 56 by insertion of pivot pin 50 through pivot openings 52, 54 therein, as shown in FIGS. 2 and 6. Resistance thermometer mechanism 24 is mounted on the lower surface of pivot element 42.

Spring 58 provides a means for releasably securing probe 12 within connector housing 26 in a predetermined position. Spring 58 is mounted on the upper surface of circuit board 28 and bears against upper connector housing 40 near rear end 60. Since upper connector housing 40 is pivotally mounted to base 36 through pivot pin 48, the force applied to upper connector housing 40 by spring 58 forces forward end 56 in a downward direction towards the forward end of base 36. The spring force applied by spring 58 is low enough to permit manual grasping and displacement of rear end 60 of upper connector housing 40 in a direction towards base 36 to permit insertion of probe 12. After probe 12 is inserted into its proper position, rear end 60 is released and probe 12 thereby mounted in the predetermined position within connector housing 26.

Since connector housing pivot element 42 is pivotally mounted to upper connector housing 40, resistance thermometer mechanism 24, which is mounted on the lower surface of pivot element 42, can easily be positioned in good physical and thermal contact with cold junctions 18 when probe member 12 is inserted into connector housing 26. In transverse cross-section, pivot element 42 has the approximate shape of an aerofoil. However, other shapes can also be used. Pivot element 42, as shown in FIG. 6, includes a cavity 62 formed in lower surface 64 thereof. As shown in the figures, resistance thermometer mechanism 24 provides a closure for cavity 62 and is electrically connected to electrical bridge circuit 34 on circuit board 28 through appropriate electrical leads. The positioning of resistance thermometer mechanism 24 over cavity 62 permits a fast temperature response time when measuring the temperature of cold junctions 18 located on probe 12.

In order to provide accurate positioning of probe 12 within connector housing 26, stop member 68 is secured to circuit board 28. Stop member 68 is positioned transverse to circuit board 28 and is either mounted thereto or formed in one piece therewith. Stop member 68 extends upward in a vertical direction from circuit board 28 and prevents longitudinal passage of probe 12 beyond a predetermined point during insertion of probe 12 into housing 26. Projection 70 is formed on a forward end of connector housing base 26 and also extends upward in a vertical direction to contact lower surface 80 of probe 12 after insertion of probe 12 into connector housing 26. Contacts 72 extend downward in a vertical direction from lower surface 80 of probe 12 and provide electrical connection between thermopile 14 and electric circuit 30 partially mounted on circuit board 28. Contacts 72 are transversely displaced from each other on lower surface 80 of probe member 12 and in combination with projection 70 form a three-point stance for probe 12. The vertical extension of contacts 72 in combination with projection 70 ensures that contacts 72 will properly contact the desired portion of circuit board 28 and electrically connect thermopile 14 to electric circuit 30 when probe 12 has been inserted into connector housing 26 and abuts against stop member 68. Connector housing base 36, upper connector housing 40, and connector housing pivot element 42 are constructed of an electrically non-conductive material such as a plastic.

Probe 12 comprises an elongated member having its longitudinal dimension in the direction of arrow 74. Probe 12 includes first end 20 which is provided with an enlarged head of suitable size and shape for taking the oral or rectal temperature of a patient, and second end 22 which is adapted to be inserted into connector housing 26. Probe 12 includes a pair of side walls 76 which define upper base surfaces 78 therebetween on which thermopile 14 is mounted. Vertically extending side walls 76 are discontinuous at first end 20 in order to permit the wire making up thermopile 14 to be wound around probe 12 from upper surface 78 to lower surface 80. In general, probe 12 can be formed as a single piece of plastic or like material which is substantially electrically non-conductive. Probe 12 is usually at least 3 inches long, with a length of about 4½ inches being particularly suitable for oral use. Thicknesses on the order of 65 to 75 mils have been found to be suitable.

Thermopile 14 comprises a predetermined length of wire which is wound around probe 12 in the longitudinal direction 74 as is shown in FIGS. 1–4. Wire 82 runs above top surface 78 of probe 12 and below lower surface 80. The two ends of the continuously wound wire terminate at contacts 72 which are mounted near second end 22 on lower surface 80. Wire 82 is spaced apart and is electrically insulated by air gaps between adjacent wires.

Thermopile 14 preferably comprises three to ten complete turns of wire 82. When more than ten turns are employed, the accuracy of clinical thermometer 10 is normally not improved. However, more than ten turns can be employed if desired. For example, experiments have been run with up to twenty complete turns of wire 82 and good results obtained. The use of only two wire turns is not desirable because of the difficulty of obtaining an accurate temperature reading. More specifically, it is very difficult to obtain a good average temperature reading when only two wire turns are employed. The use of only one turn of wire does not fall within the scope of the present invention and has proved totally unsatisfactory for obtaining accurate temperature readings. More specifically, the voltage output of a single turn of wire is too low and, because of the "point" contact with the patient's body, an average temperature cannot be obtained. For example, when taking an oral temperature reading, the patient's mouth may be dry resulting in a temperature reading on or two degrees higher than the actual oral temperature. Further, localized impurities in the thermocouple may result in false readings when only one turn of wire is used.

Recess 84 is formed in first end 20 of probe 12 as shown in FIGS. 1–3. Wire 82 passes over recess 84 with hot junctions 16 being positioned over recess 84. Recess 84 provides an air gap between the surface of probe 12 and wire 82. This forms a thermal insulation barrier between wire 82 and probe 12 and results in a fast temperature response time. Recess 84 also allows hot junctions 16 to come into more intimate contact with the body, typically the patient's tongue, and to allow saliva or other body fluid to surround the hot junction thereby resulting in a quicker and more accurate temperature reading. Recess 84 as illustrated does not pass completely through probe 12 from upper surface 78 to lower surface 80. However, recess 84 can, if desired, be formed as a hole or opening passing entirely through first end 20. Also, a bridge (not shown) can be mounted on probe 12 transversely across recess 84 so that wire 82 is supported thereon and prevented from sagging into recess 84 after being wound around probe 12. Alternatively, recess 84 can be omitted and the bridge (not shown), typically on the order of 20 mils high, can be used as the sole means for spacing hot junctions 16 from upper surface 78 of probe 12. It should be appreciated that recess 84 can be of different size and shape and that hot junctions 16 can be thermally insulated from probe 12 in various other ways not specifically illustrated.

Thermopile 14, comprising wire 82, can conveniently be formed from a first metal having a second dissimilar metal plated thereon. The second dissimilar metal can be selectively plated on the first metal after the first metal has been wound around probe 12 or, alternatively, can be plated thereon before winding and selectively deplated after winding. In the drawings, the darker portion of wire 82 represents the combination of the first and second dissimilar metals and the lighter portion represents only the first metal.

As just described, thermopile 14 is made up of wire 82 which is essentially composed of two dissimilar metals. The first or base metal generally has the lower electrical conductivity of the two dissimilar metals. The first metal can be constantan or nickel, as well as tungsten, alumel, stainless steel, platinum, palladium or other such metals. The second metal generally has a higher electrical conductivity than the first metal and extends between a first plating point and a second plating point on the upper surface 78 of probe 12. Each of these plating points defines one of the hot and cold junctions 16 and 18, respectively. The second metal can be copper or other metal such as silver or gold which has a high electrical conductivity.

One method of forming thermopile 14 is by winding a wire of the first metal, such as constantan, around probe member 12 in the longitudinal direction and then partially masking the constantan wire. The masking material can be any material that will prevent electrodeposition of the second metal such as copper. The masking can be accomplished by applying a liquid solution of an insulating material such as a lacquer or shellac. The unmasked area is then electroplated with copper by conventional electroplating techniques. It has been found that if constantan or other base metal wire of about 1 to 5 mils in diameter is used, a copper or second metal coating of approximately 1 to 5 mils will be satisfactory. First or base metal wires of over 5 mils in diameter are difficult to wind and wires of less than 1 mil are expensive to manufacture and may not be homogenous.

In various tests run, it has been observed that current flow between the electrodes in the plating solution takes a sudden jump upward at a particular point in the plating process. This sudden jump can be treated as a signal that the plating is of approximately the correct thickness. This plating observation is valuable for production purposes since the current effect is quite discrete and provides an easy method of determining when to terminate the plating. It is believed that this sudden jump or step function in current results from a shunting of the current from the constantan to the copper. While there will always be some current flow through the base constantan wire, it is apparent that a very large proportion of the current will flow through the copper coating where it is plated, since the ratio of the resistance of copper to that of constantan is approximately 5:290 ohms. It is believed that as some copper is deposited on the base constantan wire, the current flow starts to increase and this increase in current flow in turn accelerates the deposition of copper. It is apparent that these two actions effect each other and thus result in a sudden current jump at a given point in the process. When the current surge is noted, the plating process is stopped.

Another suitable method of forming thermopile 14 comprises plating the entire length of constantan wire with copper. The wire is then longitudinally wound around probe 12 until the desired number of turns are formed. The wire is then masked between hot and cold junctions 16 and 18, respectively, on upper surface 78 of probe 12. Probe 12 is then dipped into a deplating solution in order to deplate the copper from the unmasked area. Accordingly, thermopile 14 can be constructed through a deplating process as well as the plating process previously described.

Figure 7:
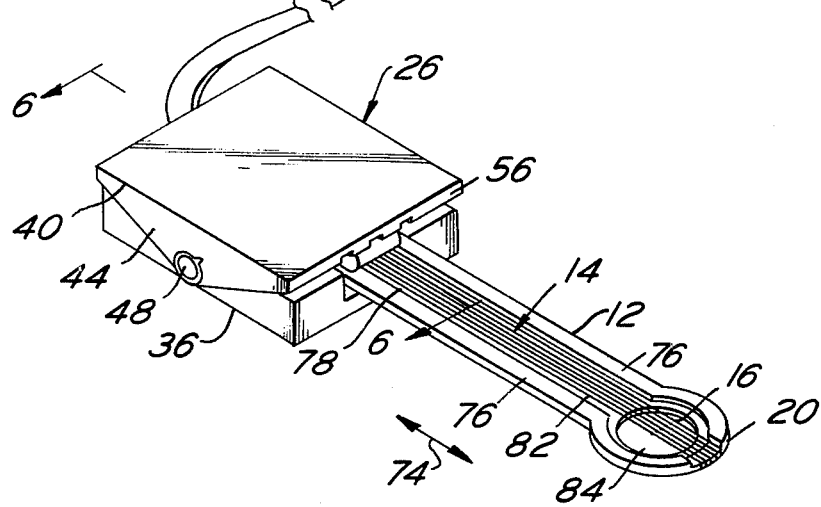
FIG. 7 is a cross-section of the resistance thermometer mechanism of FIG. 5.
Figure 7:
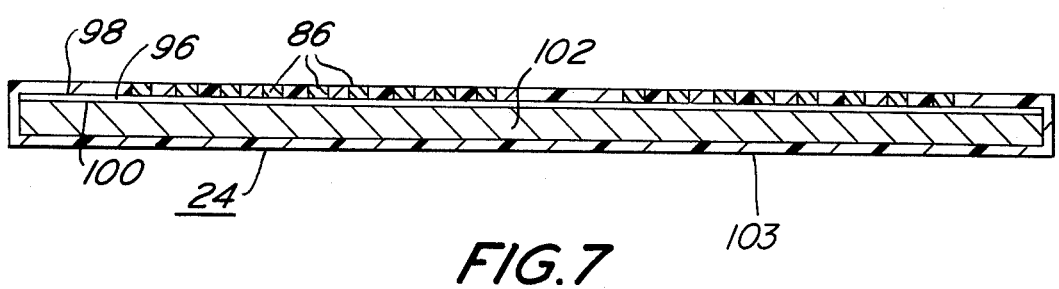
Figure 5:
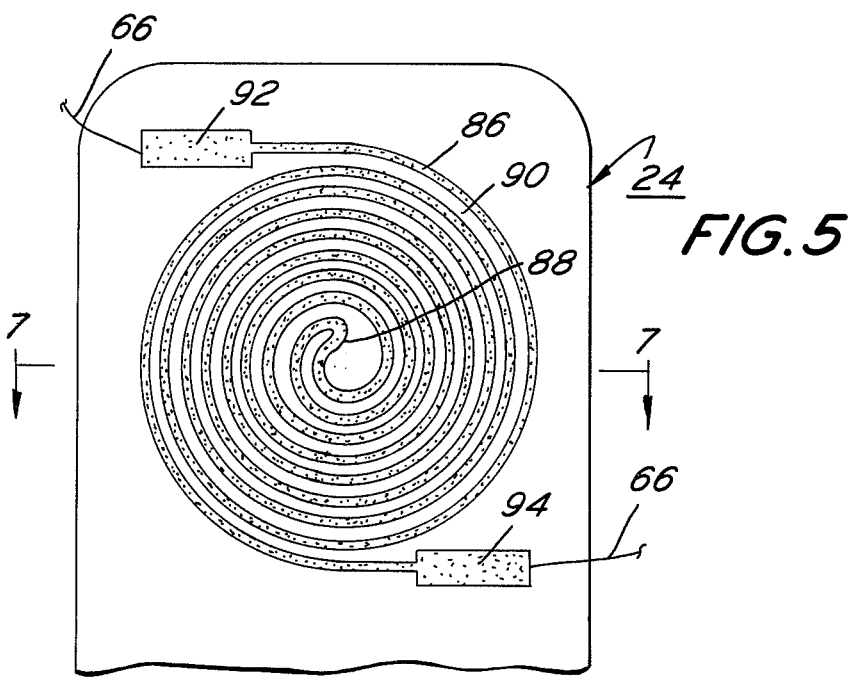
FIG. 5 is a planar view of the resistance thermometer mechanism.

The mechanism for measuring the temperature of cold junctions 18 on probe 12 is shown in FIGS. 5 and 7 which show resistance thermometer mechanism 24. In many prior art devices, the cold junction is kept at a constant temperature such as by immersing it in an ice bath to provide a constant reference temperature. By contrast, in the present invention, the temperature of cold junctions 18 is allowed to vary as a function of atmospheric conditions. However, the temperature of hot junctions 16 is read out as an absolute temperature by incorporation of resistance thermometer mechanism 24 into electrical circuit 30 in which resistance thermometer mechanism 24 forms one arm of bridge circuit 34 as shown in FIG. 8 and compensates for changes in the temperature of cold junctions 18.

The principle of operation of resistance thermometer mechanisms is well known in the art. In these mechanisms, the change in resistance of a conductor with temperature change is used to measure temperature. Metals commonly used as the sensitive element in resistance thermometers are copper, platinum and nickel. Copper is particularly preferred herein because it has a positive linear temperature coefficient of resistance over the temperature range contemplated. Referring to FIGS. 5 and 7, resistance thermometer mechanism 24 comprises a bi-filar spiral 86 of copper, typically about 2.5 mils in diameter, having a sharp reverse turn 88 located substantially near the center of the spiral. The turns of spiral 86 do not contact each other but are spaced apart at 90 so that the turns are electrically insulated from each other. Spiral 86 has first contact end 92 and second contact end 94 as is shown in FIG. 5. Leads 66 are connected to contact ends 92 and 94 and are used for inserting thermometer mechanism 24 into bridge circuit 34. A number of well known configurations for electrical contacts 92 and 94 can be used to provide the proper electrical connections within circuit 30.

In construction, resistance thermometer mechanism 24 includes electrically non-conductive base 96 such as a plastic layer having substantially opposed planar surfaces 98 and 100, respectively. Copper spiral 86 is securely mounted on surface 98 of base 96 by any conventional technique. For example, spiral 86 can be formed by conventional etching techniques used in making etched copper circuits. Briefly, an oversized picture of spiral 86 is taken, reduced in size, and printed onto an emulsion placed over a copper foil having a plastic substrate. The printed image is developed and processed to form an etching mask. The copper is then etched in an acid bath to form bi-filar spiral 86.

A difference in the thermal coefficient of expansion between copper spiral 86 and the plastic comprising non-conductive base 96 may produce a strain gauge effect which will change the physical dimensions of spiral 86 resulting in a resistance change and the inaccurate measurement of the temperature of cold junctions 18. In order to avoid this problem, thermally conductive pad 102 is used, one surface of which is mounted on surface 100 of non-conductive base 96. Pad 102 is typically made of the same material as copper sprial 86. However, any material which has a similar thermal coefficient of expansion such as nickel, berylium, stainless steel, or gold can be used. Pad 102 has a mass somewhat greater than that of either bi-filar spiral 86 or base 96. Base 96 is a "slave" to the expansion and contraction of pad 102 and so spiral 86 "floats" on a base of a material having essentially the same expansion properties. This substantially removes the strain gauge effect and further increases the accuracy of the system. Resistance thermometer mechanism 24 can be sheathed in a thin protective film 103 of plastic, silicon, rubber or similar material if desired. The diameter of resistance thermometer mechanism 24 is on the order of 5 millimeters, with pad 102 being on the order of 3 to 5 mils in thickness. Resistance thermometer mechanism 24 can be mounted to pivot element 42 with bi-filar spiral 86 facing toward or away from cavity 62.

Circuit 30 and the electrical connections between each of the basic elements of clinical thermometer 10 are shown in FIG. 8. By incorporation of resistance thermometer mechanism 24 into bridge circuit 34 in association with resistors 106, 108 and 110, an absolute temperature reading can be obtained, even with a fluctuating cold junction temperature. Bridge circuits of this type are well known in the art. As is conventional, resistors 106, 108 and 110 have low temperature coefficients.

Battery 112 is placed in series with voltage adjustment potentiometer 114, and these elements are connected to bridge circuit 34 at nodal points 116 and 118. The electrical sensitivity of bridge circuit 34 is made as nearly equal to the sensitivity of thermopile 14 as possible. This can be easily accomplished since the sensitivity of thermopile 14 is a function of the number of turns of wire 82, and since the resistance change of copper which makes up copper spiral 86 is known as a function of temperature. With these known characteristics of the system, determination of the voltage to be supplied to the bridge circuit 34 can easily be derived in a conventional manner. In actual practice, a 500 ohm voltage adjustment potentiometer 114 has been used in series with battery 112, which is approximately 1½ volts. In this manner, a voltage of approximately ½ volt is put across bridge circuit 34. Both battery 112 and potentiometer 114 can be incorporated within galvonometer 32 in order to achieve a compact system 10 and avoid the problem of having various electrical elements in different, separately located housings.

Null adjustment potentiometer 120 is connected in series with resistor 122 which somewhat desensitizes potentiometer 120. By electrically connecting potentiometer 120 and resistor 122 to nodal points 124, 118 and 126 as shown in FIG. 8, the null point of bridge circuit 34 can be easily adjusted. As with respect to battery 112 and potentiometer 114, null adjustment potentiometer 120 and resistance 122 can be located within meter 32 to provide a compact system 10.

The connection between meter 32 and circuit 34 is made through cable 128 which is typically a five lead cable. Galvanometer button or switch 104 controls actuation of dial 130 which is calibrated in degrees of temperature, and is used to connect thermopile 14 to meter 32 and battery 112 to bridge circuit 34. This is done so that battery 112 is only in an "on" condition during the time that switch 104 is actuated and measurements are being taken, otherwise battery 112 would be continually "on" and would run down rather quickly. Alternatively, meter 32 is connected to a standard 110 voltage supply through line 133 in which event conventional rectification and voltage regulation would be employed.

Thermopile mechanism 14 develops a voltage which is proportional to the temperature difference between its hot and cold junctions. The voltage across nodes 124, 126 of bridge circuit is proportional to the temperature measured by resistance thermometer mechanism 24. Voltage adjustment potentiometer 114 adjusts the input voltage to bridge 34 across terminals 116 and 118 so that the sensitivity of bridge circuit 34 substantially matches that of thermopile 14. Null adjustment potentiometer 120 is correspondingly set so that bridge 34 is balanced when resistance thermometer mechanism 24 is at a temperature reading on dial 130 which corresponds to zero voltage. Since resistance thermometer mechanism 24 is in thermal contact with the reference junctions 18 of thermopile 14, the total output voltage of bridge circuit 34 and thermopile 14 is proportional to the temperature of hot junctions 16.

In use, second end 22 of probe 12 is releasably secured in connector housing 26. As previously discussed, connector housing 26 is constructed so that cold junctions 18 will be in good physical and thermal contact with resistance thermometer mechanism 24. Copper spiral 86 and cold junctions 18 will reach thermal equilibrium in about 1 or 2 seconds. This fast temperature response time is obtained because of the thermal insulation of copper spiral 86 from connector housing 26 by means of cavity 62 and because of the previously described structure of resistance thermometer mechanism 24. Probe 12 is now ready to be inserted into the mouth or rectum of the patient.

Probe 12, as illustrated, is particularly suited for oral use. For example, first end 20 is of suitable size and shape for insertion under the patient's tongue; howver, the size and shape of first end 20 can be appropriately modified for rectal use. With this construction, the bottom of the tongue will lie flush against hot junctions 16. In this position saliva and mucus can surround hot junctions 16 and collect in recess 84. This intimate physical contact enables hot junctions 16 to quickly reach the patient's body temperature. Specifically, hot junctions 16 will reach the patient's body temperature within a matter of milliseconds, namely, on the order of 50 milliseconds. A fast temperature response time is essential to the taking of an accurate reading since the patient's oral or rectal temperature will be lowered somewhat by the relatively colder probe 12. However, this temperature change will not occur to any appreciable extent within the temperature response time of thermopile 14.

After first end 20 of probe 12 is inserted into the mouth or rectum of the patient, galvonometer button 104 is depressed until the temperature reading has been visually observed on dial 130. If desired, a conventional peak and hold circuit can be used to register the maximum temperature reading.

Although only a single embodiment of the present invention has been described herein, it should be appreciated that there are many modifications falling within the scope of the present invention. Also, while thermometer 10 has been specifically described as being useful for taking oral and rectal temperature readings, it should be understood that thermometer 10 can also be used for determining respiration rate. If a respiration rate reading is desired, first end 20 of probe 12 is held in front of the patient's mouth, galvanometer button 104 depressed and the patient asked to breath normally. The respiration rate can then be determined by observing the fluctuations of dial 130. Alternatively, the output signal from thermopile 14 can be fed through conventional electronic means including, for example, an amplifier, discriminator and counter to produce a reading indicative of breaths per unit of time. Accordingly, the present invention should only be limited as defined in the appended claims.

What is claimed is:

1. An oral or rectal probe for a clinical thermometer, comprising:
   an elongated, electrical nonconductive member having a first end of suitable size and shape for insertion into the mouth or rectum of a patient, said first end having a recess formed therein;
   thermopile means having a plurality of thermocouples connected in series mounted on said member and defining at least three hot junctions near said first end of said member and at least three cold junctions near a second end of said member, said hot junctions being positioned along a line which is transverse to said member and in the area of said recess so that said hot junctions are separated from one another and from said member by air gaps; and
   a pair of electrical contacts mounted on said member near said second end and electrically connected to said thermopile means, said second end of said member being detachably mountable in a housing comprising at least part of a system for using the emf developed by said thermopile in determining the oral or rectal temperature of said patient.

2. The probe of claim 1 wherein said thermopile means defines from three to ten hot junctions near said first end and from three to ten cold junctions near said second end.

3. The probe of claim 1 wherein said thermopile means includes at least one wire element wound around said member in the longitudinal direction thereof.

4. The probe of claim 3 wherein said wire element comprises a first metal wire of the same length as said wire element and a second metal adhering to said first metal throughout a portin of the longitudinal length of said wire element on the upper surface of said member.

5. The probe of claim 4 wherein said second metal is plated on said first metal wire from a first plating point defining said hot junctions to a second plating point defining said cold junctions.

6. The probe of claim 5 wherein said first metal of said wire element is constantan.

7. The probe of claim 6 wherein said second metal of said wire element is copper.

8. The probe of claim 1 wherein said member is made of plastic.

9. A connector for use with a clinical thermometer probe of the type having thermopile means mounted thereon defining a plurality of hot junctions near a first end of said probe and a plurality of cold junctions near a second end of said probe, comprising: a connector housing; resistance thermometer means for measuring the temperature of said cold junctions of said thermopile means mounted in said connector housing, said resistance thermometer means including an electrically non-conductive base having opposed substantially planar surfaces, an electrically conductive material formed into a flat resistance element mounted on one of said surfaces of said base, and a thermally conductive pad mounted to the other one of said surfaces of said base, said pad being secured to said connector housing; and means for releasably securing said second end of said probe in said connector housing in a predetermined position so that said cold junctions are in physical and thermal contact with said resistance thermometer means.

10. The connector of claim 9 wherein said pad has a mass greater than the mass of said flat resistance element.

11. The connector of claim 9 wherein said pad and said flat resistance element are constructed of the same metal.

12. The connector of claim 11 wherein said pad and said flat resistance element are composed of copper.

13. The connector of claim 9 wherein said flat resistance element mounted to said base has a bi-filar geometric contour.

14. The connector of claim 9 wherein said pad mounted to said connector housing faces a cavity formed in said connector housing.

15. The connector of claim 9 wherein said means for releasably securing said probe includes an upper connector housing pivotally mounted on said connector housing base, and a connector housing pivot element pivotally mounted to said upper connector housing at a forward end thereof, said pivot element having said resistance thermometer means mounted on a lower surface thereof.

16. The connector of claim 15 wherein said connector housing pivot element includes a cavity formed in a lower portion thereof.

17. The connector of claim 16 wherein said resistance thermometer means is mounted adjacent said cavity formed in said connector housing pivot element.

18. The connector of claim 16 wherein said resistance thermometer means acts as a closure for said cavity formed in said connector housing pivot element.

19. The connector of claim 9 wherein said releasable securing means includes a projection formed on the forward end of said connector housing base, said projection projecting above said base for contacting the lower surface of said probe when said probe is secured within said connector housing.

20. A clinical thermometer, comprising:
a. a probe including an elongated, electrically nonconductive member having a first end of suitable size and shape for insertion into the body of a patient and thermopile means having a plurality of thermocouples connected in series mounted on said member and defining a plurality of hot junctions near said first end of said member and a plurality of cold junctions near a second end of said member;
b. connector means for said probe including a connector housing, resistance thermometer means for measuring the temperature of said cold junctions of said thermopile means mounted in said connector housing, and means for releasably securing said second end of said probe in said connector housing in a predetermined position so that said cold junctions are in physical and thermal contact with said resistance thermometer means; and
c. electrical circuit means for measuring the temperature of said hot junctions of said thermopile means, said electrical circuit means including a bridge circuit in which said resistance thermometer means forms one arm of said bridge circuit for measuring the temperature of said cold junctions, at least a portion of said electrical circuit means being mounted in said connector housing so that said thermopile means is electrically connected to said electrical circuit means when said probe is releasably secured in said connector housing, said electrical circuit means combining the output of said thermopile means and said bridge circuit to give a signal proportional to the temperature of said hot junctions.

21. The clinical thermometer of claim 20 wherein said probe includes a pair of electrical contacts mounted on said probe member, electrically connected to said thermopile means, and extending below the lower surface of said probe member for contacting said portion of said electrical circuit means when said probe is inserted into said connector housing.

22. The clinical thermometer of claim 20 wherein said electrical circuit means includes a galvanometer calibrated in degrees of temperature, said galvanometer being electrically connected to said thermopile means and said bridge circuit for providing a temperature read out.

23. The clinical thermometer of claim 20 wherein said thermopile means defines at least three hot junctions near said first end and at least three cold junctions near said second end.

24. The clinical thermometer of claim 20 wherein said thermopile means defines from three to ten hot junctions near said first end and from three to ten cold junctions near said second end.

25. The clinical thermometer of claim 20 wherein said probe is an oral probe and said first end is of suitable size and shape for insertion into the mouth.

26. The clinical thermometer of claim 20 wherein said probe is a rectal probe and said first end is of suitable size and shape for insertion into the rectum.

27. The clinical thermometer of claim 20 wherein said hot junctions are separated from said member by air gaps.

28. The clinical thermometer of claim 20 wherein said thermopile means includes at least one wire element wound around said member in the longitudinal direction thereof.

29. The probe of claim 28 wherein said wire element comprises a first metal wire of the same length as said wire element and a second metal adhering to said first metal throughout a portion of the longitudinal length of said wire element on the upper surface of said member.

30. The probe of claim 29 wherein said second metal is plated on said first metal wire from a first plating point defining said hot junctions to a second plating point defining said cold junctions.

31. The clinical thermometer of claim 30 wherein said member has a recess formed in the upper surface of said member near said first end.

32. The clinical thermometer of claim 31 wherein said wire element wound around said member passes over said recess.

33. The clinical thermometer of claim 32 wherein said first plating point is located over said recess.

34. The clinical thermometer of claim 38 wherein said first metal of said wire element is constantan.

35. The clinical thermometer of claim 34 wherein said second metal of said wire element is copper.

36. The clinical thermometer of claim 20 wherein said member is made of plastic.

37. The clinical thermometer of claim 20 wherein said resistance thermometer means includes an electrically non-conductive base having opposed substantially planar surfaces, an electrically conductive material formed into a flat resistance element and mounted on one of said surfaces of said base, and a thermally conductive pad mounted to the other one of said surfaces of said base, said thermally conductive pad being secured to said connector housing.

38. The clinical thermometer of claim 37 wherein said pad has a mass greater than the mass of said flat resistance element.

39. The clinical thermometer of claim 37 wherein said pad and said flat resistance element are constructed of the same metal.

40. The clinical thermometer of claim 39 wherein said pad and said first resistance element are composed of copper.

41. The clinical thermometer of claim 37 wherein said flat resistance element mounted to said base has a bi-filar geometric contour.

42. The clinical thermometer of claim 37 wherein said pad mounted to said connector housing faces a cavity formed in said connector housing.

43. The clinical thermometer of claim 20 wherein said connector housing includes a connector housing base having a recess formed therein and wherein said portion of said electrical circuit is mounted to said base within said recess.

44. The clinical thermometer of claim 43 wherein said means for releasably securing said probe includes an upper connector housing pivotally mounted on said connector housing base, and a connector housing pivot element pivotally mounted to said upper connector housing at a forward end thereof, said pivot element having said resistance thermometer means mounted on a lower surface thereof.

45. The clinical thermometer of claim 44 wherein said connector housing pivot element includes a cavity formed in a lower portion thereof.

46. The clinical thermometer of claim 45 wherein said resistance thermometer means is mounted adjacent said cavity formed in said connector housing pivot element.

47. The clinical thermometer of claim 45 wherein said resistance thermometer means acts as a closure for said cavity formed in said connector housing pivot element.

48. The clinical thermometer of claim 20 wherein said releasable securing means includes a projection formed on the forward end of said connector housing base, said projection projecting above said base for contacting the lower surface of said probe when said probe is secured within said connector housing.

49. The probe of claim 1 wherein said probe is an oral probe, said first end is of suitable size and shape for insertion into the mouth and said non-conductive member is substantially flat.

* * * * *